United States Patent [19]

Marsden et al.

[11] 4,102,425
[45] Jul. 25, 1978

[54] FRONT WHEEL DRIVE SYSTEM FOR A VEHICLE

[75] Inventors: Howard A. Marsden, Pekin; Willard J. Haak, Peoria, both of Ill.

[73] Assignee: Caterpillar Tractor Co., Peoria, Ill.

[21] Appl. No.: 780,559

[22] Filed: Mar. 23, 1977

[51] Int. Cl.² ............................................. B60K 17/10
[52] U.S. Cl. .................................... 180/66 F; 60/468
[58] Field of Search ................ 180/44 R, 44 F, 66 R, 180/66 F, 6.2, 6.4 B, 44 M; 60/464, 468

[56] References Cited

U.S. PATENT DOCUMENTS

| 3,522,861 | 8/1970 | Middlesworth | 180/44 M |
|---|---|---|---|
| 3,680,652 | 8/1972 | Greene | 180/44 F X |
| 3,811,525 | 5/1974 | Stuart | 180/44 M |
| 3,902,566 | 9/1975 | Bird | 180/66 F |

Primary Examiner—Joseph F. Peters, Jr.
Assistant Examiner—Gene A. Church
Attorney, Agent, or Firm—Phillips, Moore, Weissenberger, Lempio & Strabala

[57] ABSTRACT

A vehicle includes an auxiliary front wheel drive system including fluid motors, and a valve movable to supply fluid pressure thereto for driving thereof. A second valve is included in communication with the exhaust conduits of the motors, blocking flow therethrough when the first-mentioned valve is not supplying fluid to the motors. Further a transmission is included for regulating the fluid pressure provided to the fluid motors. Another aspect includes a pressure relief valve and means for selectively varying the relief pressure of the pressure relief valve to provide proper torque characteristics to the front wheel drive system.

8 Claims, 2 Drawing Figures

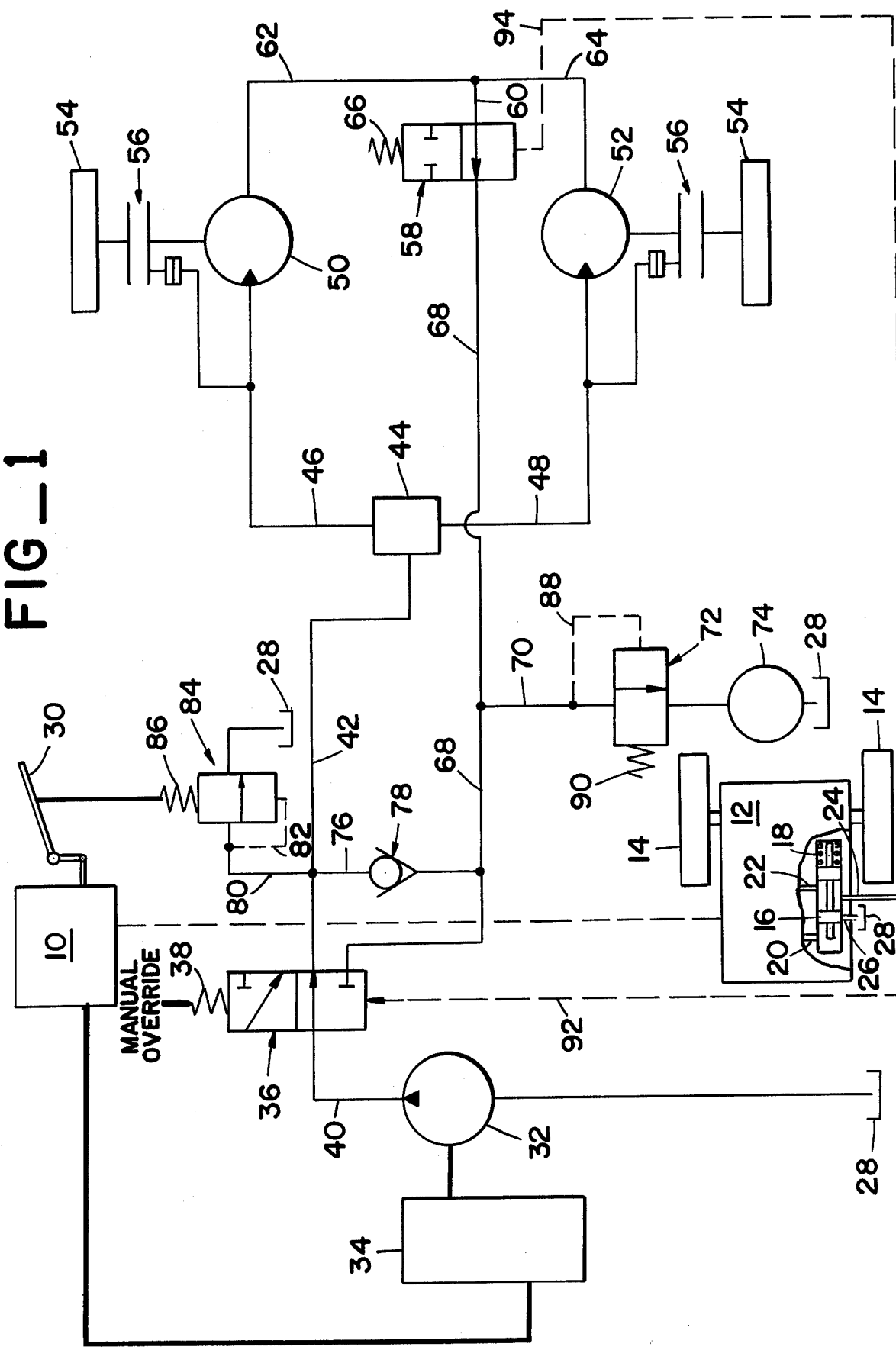

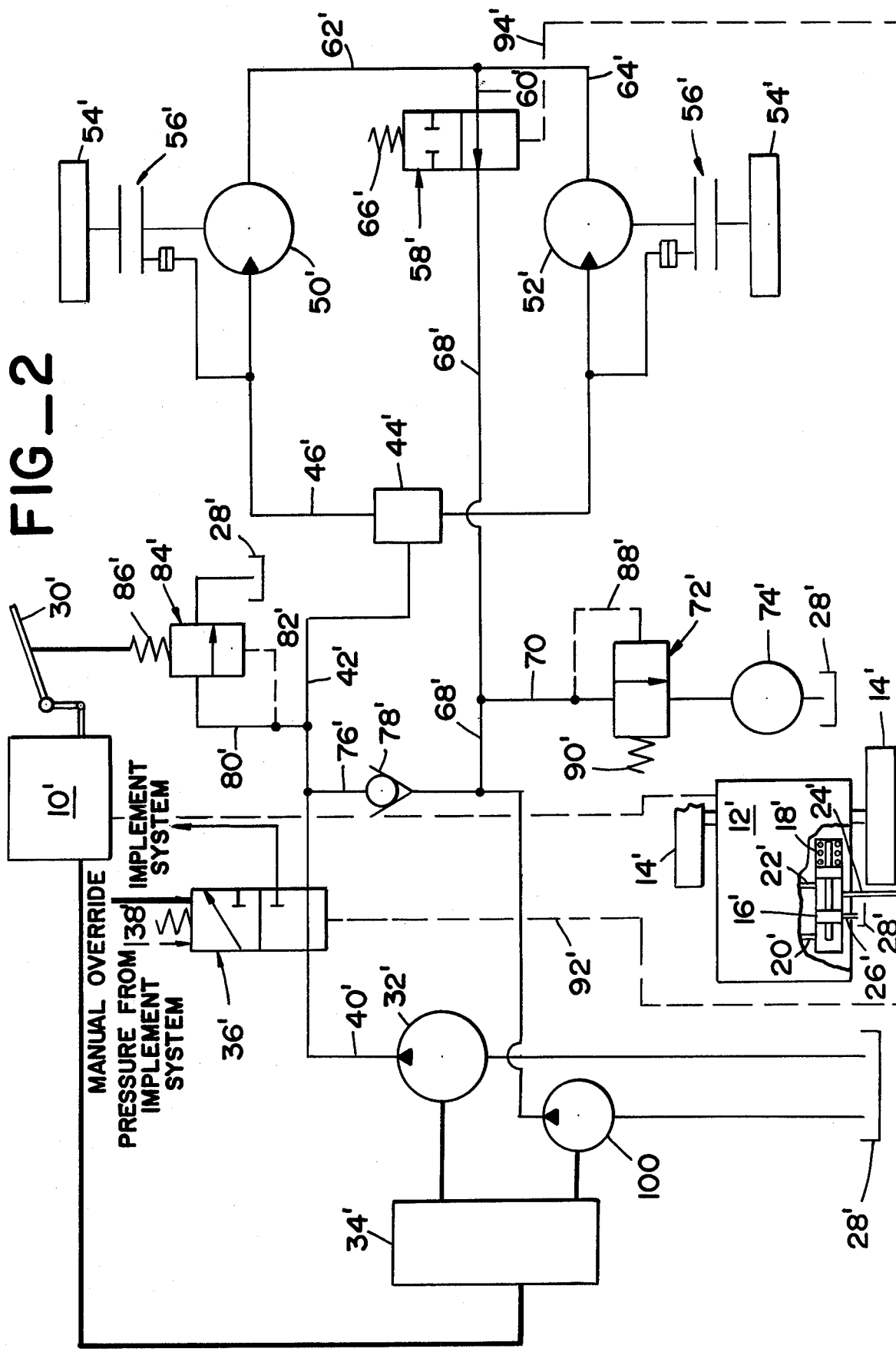
FIG_2

FRONT WHEEL DRIVE SYSTEM FOR A VEHICLE

BACKGROUND OF THE INVENTION

This invention relates to drive systems for a vehicle, and more particularly, to auxiliary front wheel drive system for a vehicle.

In general, in drive systems for a vehicle wherein auxiliary front-wheel drive is provided, means are included for selectively supplying pressurized fluid to fluid motors for driving front wheels of the vehicle. The fluid driving such motors then exits from the motors through exhaust conduit means, and thence to tank. In general, when the front-wheel system is not in use, no pressurized fluid is being supplied to such motors, but the exhaust conduits are still in communication with tank so that the motors may have a tendency to rotate or "motor" during operation of only the rear-wheel drive of the vehicle. Further, it would be desirable to have the transmission of the vehicle operatively associated with the auxillary front-wheel drive, such that the shifting of the transmission regulates the pressurized fluid provided to the fluid motors.

Additionally, it will be understood that it is highly desirable to provide proper torque characteristics of the front wheel drive system in relation to the rear wheel drive system when both are in use.

SUMMARY OF THE INVENTION

The present invention is directed to overcoming one or more of the problems as set forth above.

According to the present invention, a drive system for a wheel of a vehicle comprises a fluid pump, and a first valve. First conduit means interconnect the pump and first valve. A fluid motor is operatively associated with a wheel of the vehicle, and second conduit means interconnect the first valve and motor. Further included is a second valve, and third conduit means interconnecting the motor and second valve. Fourth conduit means communicate with the second valve. The first valve is movable to provide fluid communications therethrough from the pump through the first conduit means, through the second conduit means to the motor. The first valve is movable to block communications therethrough from the pump through the first conduit means, through the second conduit means to the motor. The second valve is movable to provide fluid communications therethrough from the motor through the third conduit means, to the fourth conduit means. The second valve is movable to block communication therethrough from the motor through the third conduit means to the fourth conduit means. Further included are means for providing that upon movement of the first valve to provide fluid communication therethrough from the pump, first conduit means, second conduit means, to the fluid motor, the second valve is moved to provide communication therethrough from the motor through the third conduit means to the fourth conduit means, and for providing that upon movement of the first valve to block communication therethrough from the pump, first conduit means, second conduit means to the fluid motor, the second valve moves to block communications therethrough from the motor through the third conduit means to the fourth conduit means. The means operatively interconnecting the first and second valve comprise additional conduit means, wherein introduction of fluid pressure therein moves the first and second valves to provide fluid communication therethrough respectively, and wherein release of fluid pressure therefrom provides movement of the first and second valves to block communication therethrough respectively. The drive system further comprises vehicle transmission means operatively associated with the additional conduit means and includes means for providing introduction of fluid pressure into the additional conduit means, and for providing release of fluid pressure from the additional conduit means.

An aspect of the invention includes pressure relief valve means and means for selectively varying relief pressure of the pressure relief valve means to provide proper torque characteristics to the wheel.

Thus the present invention provides for a drive system for a wheel of a vehicle that blocks fluid from entering and exiting the fluid motor, so that the wheel does not rotate when the drive system is not in use. Further, the drive system has the advantage of having the transmission operatively associated with the wheel.

The present invention has the added advantage of regulating the fluid pressure provided to the fluid motor to provide proper torque characteristics.

BRIEF DESCRIPTION OF THE DRAWINGS

Other objects of the invention will become apparent from a study of the following specifications and drawings in which:

FIG. 1 is a schematic view of the first embodiment of the present invention; and FIG. 2 is a schematic view of a second embodiment of the present invention.

DESCRIPTION OF THE PREFERRED EMBODIMENT

Shown in FIG. 1 is a first embodiment of the drive system for a vehicle. Such system includes a vehicle engine 10 in operative association with a vehicle transmission 12. The transmission 12 in turn is operatively connected with the rear wheels 14 of the vehicle, such transmission 12 being capable of determining a plurality of vehicle drive conditions through driving of the rear wheels 14. For example, the transmission 12 is a multi-speed transmission wherein, as an example, a reciprocable spool 16 is included therein. Wherever a first gear drive condition of the vehicle multi-speed transmission is called for, application of fluid pressure to conduit 20 moves occupied spool 16 to a first position against the resilience of a spring 18 as shown in FIG. 1, to provide that fluid pressure is directed from conduit 22 past spool 16 into conduit 24, thereby engaging the first wheel drive system.

When a non-first gear condition of the vehicle prevails, fluid pressure in conduit 20 is released which allows the spool 16 to move to a second position under the resilience of spring 18, wherein pressure is released from conduit 24 thru conduit 26 to tank 28.

The engine 10 is operable by a conventional operator control pedal 30 operatively connected with the engine 10, so that movement of the pedal 30 downward increases the driving speed of the engine 10 and raising of the pedal 30 decreases such driving speed as is well known.

The engine 10 drives a fixed displacement fluid pump 32 through a gear box 34. A valve 37 is biased by a spring 38 into a downward position, and a conduit 40 communicates the outlet of the pump 32 with the valve 36. The pump 32 draws fluid from a reservoir 28. A conduit 42 leads from the valve 36 to a flow divider 44, from which conduits 46, 48 branch. The conduit 46 communicates with the inlet of a fluid motor 50. The fluid motors 50, 52 are operatively associated with the front wheels 54 of the vehicle, through clutches 56 which engage on application of fluid pressure in the conduits 46, 48.

A second valve 58 is included in the system. Such valve 58 communicates with a conduit 60 which in turn communicates with exhaust flow conduits 62, 64 communicating with the respective motors 50, 52. The valve 58 is biased into a downward position by a spring 66.

A conduit 68 leads from the valve 58 back to the valve 36. A branch conduit 70 communicates with the conduit 68, leading to a by-pass valve 72 and thence to a cooler 74 and to reservoir 28. A conduit 76 interconnects the conduit 42 and conduit 68, and a check valve 78 is included in such conduit 76, blocking flow from conduit 42 to conduit 68, but allowing flow from conduit 68 to conduit 42. A conduit 80 leads from the conduit 42, in turn leading to a branch conduit 82 communicating with a valve 84, so that with pressure applied in the conduit 42, the valve 84 is urged to its upward position against the bias of the spring 86. Similarly, a conduit 88 communicates with the conduit 70, leading to the valve 72, so that application of fluid pressure into the conduit 68 tends to move the valve against the bias of a spring 90.

It will be seen that the valve 36 in its downward position provides communication between conduit 40 and conduit 68 so that pump flow passes through valve 36 to conduit 70, past by-pass valve 72 through the cooler 78 to tank 28. The valve 36 is also movable to its upward position upon application of fluid pressure into the conduit 24 and conduit 92, whereby communication is provided between conduit 40 and conduit 42 to flow divider 44 and motors 50, 52. Likewise, the valve 58 is movable to its lower position wherein communication between conduit 60 and conduit 68 is blocked. Application of fluid pressure to the conduit 24 and conduit 94 moves the valve 58 upward so that communication between conduit 60 and conduit 68 is provided.

In the state of vehicle drive wherein first gear is not chosen, conduit 24 communicates with reservoir 28 past the spool 16. Thus, there is no pressure in conduit 92 and conduit 94 and the springs 38, 66 hold the valves 36, 58 in their lower positions. In such state, the pump 32 provides fluid flow through the valve 36 to conduit 68 and into conduit 70 past by-pass valve 72 and to tank 28. Upon shifting of the vehicle into first gear, which shifts the spool 16, fluid pressure is thereby applied into conduit 24 and conduits 92, 94 moving both valves 36, 58 to their upward positions as shown. In such state, fluid flow takes place through the motors 50, 52, it being remembered that the valve 58 has been shifted to its upward position to allow exhaust flow from the motors 50, 52 into conduit 68 and thence to conduit 70 past valve 72 to tank 28.

Upon shifting of the vehicle out of first gear, the spool 16 moves leftward (FIG. 1), wherein pressure is relieved from the conduit 92 and conduit 94. The springs 38 thereby shift the valve 36 downwardly, so that again fluid flow from the pump 32 passes through valve 36, through conduit 68, thence to conduit 70 and past the by-pass valve 72 to tank 28. Meanwhile, with the valve 58 shifted downwardly, communication between conduit 60 and conduit 68 is blocked, so that in effect the motors 50, 52 are braked.

It is to be noted that a manual override of the valve 36 is incorporated, wherein the valve 36 can be moved by the operator downwardly to selectively bypass the front drive of the vehicle even though the vehicle is in fact in first gear.

The relief valve of the system is the valve 84 which communicates with the conduit 42 by conduit 80. The relief valve 84 is biased into a downward position by spring 86 as is well known. The relief valve 84 is operatively connected with the operator pedal 30, so that movement of the pedal 30 downward tends to increase the relief pressure of the pressure relief valve 84, while movement of the pedal 30 upward tends to decrease the relief pressure of the relief valve 84. It is to be noted that, if the vehicle is in first gear, with the engine 10 running at low rpm's, an increase in rpm's would apply more torque to the rear wheels 14. Without the variable pressure relief valve 84 as shown, and with the engine at low rpm's, the front wheels 54 would be driven at a maximum pressure and maximum torque due to the low rpm's. Then, as the engine rpm increases, the driving torque of the back wheels 14 would increase. In the present system, a relatively low pressure bypass system is included with the tranmission 12 in first gear and the engine 10 at low rpm's so that the maximum pressure in conduit 42 supplied to motors 50, 52 is relatively low, so that the driving torque thereof is relatively decreased. Upon movement of the pedal 30 downward, the driving torque of the rear wheels 14 is increased, and also the relief pressure of the pressure relief valve 84 is increased, so that the maximum pressure which can be applied to the motors 50, 52 from the conduit is increased, so that there is a reasonably paralleled matchup between the driving torque of the rear wheels 14 and the driving torque of the front wheels 54 throughout actuation of the pedal 30.

In FIG. 2 is shown a system similar to that shown in FIG. 1. However, in such system, the fixed displacement fluid pump 32' is an implement pump which is capable of supplying fluid pressure to drive the motors 50', 52' of the vehicle in accordance with the previous embodiment when the implement system is not in use. With the implement system in use, the valve 36' will be forced downward so that the implement system takes priority over the front wheel drive system of the vehicle. Also included in the system is a charge pump 100 which communicates with the conduit 42' through a check valve 78' to provide makeup fluid in the conduit 42' if needed.

The embodiments of the invention in which an exclusive property or privilege is claimed are defined as follows:

1. a drive system for a wheel of a vehicle comprising:
a fluid pump;
a first valve;
first conduit means interconnecting the pump and first valve;
a fluid motor operatively associated with a wheel of the vehicle;
second conduit means interconnecting the first valve and motor;
a second valve;
third conduit means interconnecting the motor and second valve;
fourth conduit means communicating with the second valve;
the first valve being movable to provide fluid communication therethrough from the pump through the first conduit means through the second conduit means, to the motor;

the first valve being movable to block communication therethrough from the pump through the first conduit means through the second conduit means to the motor;

the second valve being movable to provide fluid communication therethrough from the motor through the third conduit means, to the fourth conduit means;

the second valve being movable to block communication therethrough from the motor through the third conduit means, to the fourth conduit means;

means operatively interconnecting the first and second valves for providing that upon movement of the first valve to provide fluid communication therethrough from the pump, first conduit means, second conduit means, to the fluid motor, the second valve is moved to provide communication therethrough from the motor through the third conduit means to the fourth conduit means, and for providing that upon movement of the first valve to block communication therethrough from the pump, first conduit means, second conduit means to the fluid motor, the second valve moves to block communication therethrough from the motor through the third conduit means to the fourth conduit means;

wherein the means operatively interconnecting the first and second valves comprise additional conduit means, wherein introduction of fluid pressure therein moves the first and second valves to provide fluid communication therethrough respectively, and wherein release of fluid pressure therefrom provides movement of the first and second valves to block communication therethrough respectively; and further comprising vehicle transmission means operatively associated with the additional conduit means and including means for providing introduction of fluid pressure into the additional conduit means, and for providing release of fluid pressure from the additional conduit means.

2. The apparatus of claim 1 wherein a second wheel of the vehicle is drivable through the vehicle transmission means.

3. The apparatus of claim 1 wherein the fluid pump is a fixed displacement fluid pump.

4. The apparatus of claim 1 wherein the fluid pump is an implement pump.

5. A drive system for a wheel of a vehicle comprising:
a fluid pump;
a fluid motor operatively associated with a wheel of the vehicle;
conduit means interconnecting the pump and the motor;
conduit means communicating with and leading from the motor;
pressure relief valve means operatively associated with the conduit means interconnecting the pump and motor; and
means for selectively varying relief pressure of the pressure relief valve wherein the means for selectively varying relief pressure of the pressure relief valve comprise operator control means operatively connected with a second wheel of the vehicle, for providing that movement of the operator control means in one direction increases driving torque of said second wheel, and movement in another direction decreases driving torque of the second wheel, and means operatively interconnecting the relief valve and operator control means for providing that movement of the operator control means in one direction increases relief pressure of the pressure relief valve, and movement of the operator control means in said another direction decreases relief pressure of the pressure relief valve.

6. The apparatus of claim 5 and further comprising vehicle engine and transmission means operatively associated with the second wheel of the vehicle, so that the second wheel is drivable through the transmission means.

7. The apparatus of claim 6 wherein the operator control means comprise an operator control lever operatively connected with said engine.

8. The apparatus of claim 1 wherein the means for providing introduction of fluid pressure into and release of fluid pressure from the additional conduit means includes a spool.

* * * * *